J. BIGGERSTAFF.
MANUFACTURE OF COMMUTATOR BARS.
APPLICATION FILED NOV. 7, 1914.

1,242,417.  Patented Oct. 9, 1917.

UNITED STATES PATENT OFFICE.

JAMES BIGGERSTAFF, OF YONKERS, NEW YORK, ASSIGNOR TO OTIS ELEVATOR COMPANY, OF JERSEY CITY, NEW JERSEY, A CORPORATION OF NEW JERSEY.

MANUFACTURE OF COMMUTATOR-BARS.

1,242,417.     Specification of Letters Patent.     Patented Oct. 9, 1917.

Application filed November 7, 1914. Serial No. 870,932.

*To all whom it may concern:*

Be it known that I, JAMES BIGGERSTAFF, a citizen of the United States, residing in Yonkers, in the county of Westchester and State of New York, have invented a new and useful Improvement in the Manufacture of Commutator-Bars, of which the following is a specification.

The present invention has to do with a new and improved method consisting in the preparation of terminal slots in commutator cups, prior to the soldering operation of the armature coil leads or terminals therein.

In this class of work it is a well known fact that it is necessary in order to accomplish satisfactory results in the way of solder joints, to take precautionary measures to prevent oxidation of the slots in the commutator cups into which the leads from the armature coils are soldered. Thus it has been a common practice to use a heated soldering iron by means of which the slots are coated with solder, this process in shop terms ordinarily being called "tinning".

There are objections both to the use of solder as a coating as well as to the method itself, the main objections to the latter being due to the fact that it is a laborious operation and involves a great expenditure in gas for heating and repair of the soldering irons. A further objection to the method, resides in the quite frequent burning of the cups due to an overheated iron, resulting, upon attempt being made to solder the commutator leads into such cups, in a poorly soldered joint which seriously affects the performance of the motor.

Now as to the objection to the use of solder as a coating, it is found that unless a workman exercises great skill and care, he is apt to apply the layers of solder a trifle too thick, thus preventing the armature leads which have been rolled to certain size from fitting the commutator cups, and causing a considerable amount of extra labor in making the cups of proper dimensions to receive the leads.

Figure 1:
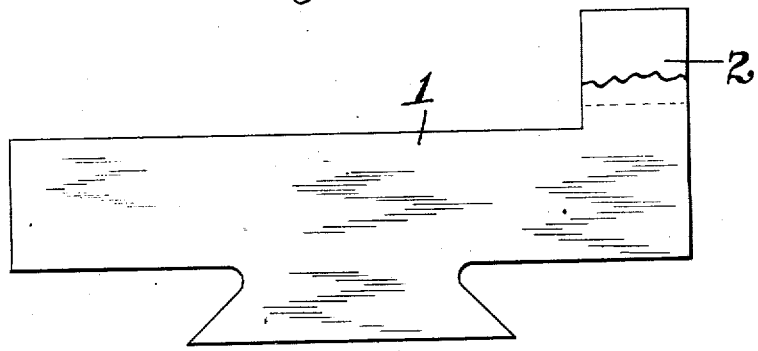
Figure 2:
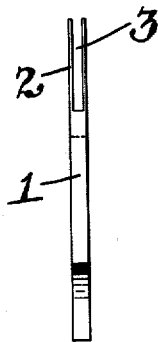

It is the aim of my improved method to overcome these objectionable features, and with the aid of the accompanying drawings comprising Figures 1 and 2 which illustrate a well known form of commutator bar having a slotted cup, I will proceed with a description of the same.

The commutator bars such as 1, for example, are first assembled, and the cups 2 are then milled to form a slot 3 therein, the slots as is well known receiving a lead or leads from the armature coils which leads are soldered in the said slots. Now directly after the slots are milled, they are painted with a solution of liquid resin, the resin being cut with gasolene. As the gasolene evaporates the resin hardens, and in this manner there is formed in each slot, a thin layer of resin which effectually prevents the slots from becoming oxidized for an indefinite period of time. Any other well known non-acid constituents in the form of a flux dissolved in a volatile fluid may be used with equal success as those above stated.

The leads of the armature may now be positioned in the slots and soldered therein in the usual manner, it being particularly noted that in the soldering operation, the resin lining already formed in the slots, will in function, now serve as a soldering flux.

Now by comparing the new method with the old, involving the tinning process, it will be seen that the former involves a much simpler operation, which of course means a saving of labor, and furthermore there is an additional saving in the elimination of the heated irons and solder and waste of solder, that is, as necessitated by the old method for tinning.

Further advantages of the new method reside in the elimination of the objectionable burning of the commutator bars, and also in the assurance that the slots in the cups will be of certain dimensions.

Having thus described my new and improved method, what I claim and desire to secure by Letters Patent of the United States is:—

1. In the art of manufacturing commutator bars, the process which consists in first assembling the commutator bars, then cutting the terminal slots therein and coatng the latter with a soldering flux in solution, while they are still bright.

2. In the art of manufacturng commutator bars, the process which consists in first assembling the commutator bars, then cutting the terminal slots therein and coating the latter with a soldering flux dissolved with a volatile fluid, while they are still bright.

3. In the art of manufacturing commutator bars, the process which consists in first assembling the commutator bars, then cutting the terminal slots therein and coating the latter with a soldering flux dissolved in gasolene, while they are still bright.

4. In the art of manufacturing commutator bars, the process which consists in first assembling the commutator bars, then cutting the terminal slots therein and coating the latter with resin dissolved in gasolene, while they are still bright.

5. In the art of manufacturing commutator bars, the process which consists in first assembling the commutator bars, then cutting terminal slots therein and coating the latter with resin in liquid form, while they are still bright.

6. In the art of manufacturing commutator bars, the process which consists in first assembling the commutator bars, then cutting terminal slots therein and coating the latter with a soldering flux in liquid form, while they are still bright.

In testimony whereof, I have signed my name to this specification in the presence of two subscribing witnesses.

JAMES BIGGERSTAFF.

Witnesses:
 EARL BIGGERSTAFF,
 JULIUS ANDERSON.